US012048033B2

United States Patent
Jones

(10) Patent No.: US 12,048,033 B2
(45) Date of Patent: Jul. 23, 2024

(54) INTERNET-OF-THINGS (NB-IoT) CARRIER-BASED INTEGRATED ACCESS AND BACKHAUL

(71) Applicant: T-Mobile USA, Inc., Bellevue, WA (US)

(72) Inventor: David Jones, Bellevue, WA (US)

(73) Assignee: T-Mobile USA, Inc., Bellevue, WA (US)

(\*) Notice: Subject to any disclaimer, the term of this patent is extended or adjusted under 35 U.S.C. 154(b) by 0 days.

(21) Appl. No.: 18/126,849

(22) Filed: Mar. 27, 2023

(65) Prior Publication Data

US 2023/0239677 A1 Jul. 27, 2023

Related U.S. Application Data

(62) Division of application No. 17/075,626, filed on Oct. 20, 2020, now Pat. No. 11,632,811.

(51) Int. Cl.
| | |
|---|---|
| *H04W 76/12* | (2018.01) |
| *G16Y 30/00* | (2020.01) |
| *H04W 4/021* | (2018.01) |
| *H04W 4/50* | (2018.01) |
| *H04W 8/18* | (2009.01) |
| *H04W 8/20* | (2009.01) |
| *H04W 12/06* | (2021.01) |
| *H04W 76/15* | (2018.01) |

(52) U.S. Cl.
CPC .......... *H04W 76/12* (2018.02); *G16Y 30/00* (2020.01); *H04W 4/021* (2013.01); *H04W 4/50* (2018.02); *H04W 8/183* (2013.01); *H04W 8/205* (2013.01); *H04W 12/06* (2013.01); *H04W 76/15* (2018.02)

(58) Field of Classification Search
CPC ....... H04W 12/06; H04W 4/021; H04W 4/50; H04W 8/183; H04W 8/205
See application file for complete search history.

(56) References Cited

U.S. PATENT DOCUMENTS

| | | | |
|---|---|---|---|
| 10,356,631 B1* | 7/2019 | Pawar | H04B 7/0617 |
| 2018/0098293 A1 | 4/2018 | Jiang et al. | |
| 2019/0312619 A1 | 10/2019 | Abedini et al. | |
| 2021/0029025 A1* | 1/2021 | Abedini | H04L 45/306 |

FOREIGN PATENT DOCUMENTS

CN        111096016 A      5/2020

OTHER PUBLICATIONS

U.S. Appl. No. 17/075,626, Notice of Allowance mailed Dec. 15, 2022, 20 pages.
U.S. Appl. No. 17/075,626, Office Action mailed Jul. 13, 2022, 34 pages.

\* cited by examiner

*Primary Examiner* — Zhensheng Zhang

(57) ABSTRACT

A wireless backhaul link is established between the IAB node and an IAB donor node via a first Narrow-Band Internet-of-Things (NB-IoT) carrier, in which the IAB donor node provides the IAB node with access to a wired backhaul connection that links to a core network of the wireless carrier network. One or more corresponding wireless backhaul links are further established between the IAB node and one or more additional IAB nodes via a one or more corresponding NB-IoT carriers. A wireless access link is then established between the IAB node and an NB-IoT user device or between the IAB donor node and the NB-IoT user device via a second NB-IoT carrier.

20 Claims, 7 Drawing Sheets

INTERNET-OF-THINGS (NB-IoT) CARRIER-BASED INTEGRATED ACCESS AND BACKHAUL

CROSS REFERENCE TO RELATED PATENT APPLICATION

This patent application is a divisional application of U.S. patent application Ser. No. 17/075,626, filed on Oct. 20, 2020, entitled "Extended Narrowband Internet-of-Things (NB-IoT) Carrier-based IAB Coverage," which is hereby incorporated by reference in its entirety.

BACKGROUND

Integrated access and backhaul (IAB) is the concept of using a part of the wireless signal bandwidth of a one base station (gNodeB), referred to as an IAB donor node, to provide a wireless backhaul link for another base station (gNodeB), referred to as an IAB node. In other words, the radio resource of the IAB donor node is used for both radio access by mobile termination (MT) and backhaul relay between the IAB donor node and the subsequent IAB node. The other IAB node may in turn use part of its wireless signal bandwidth for the wireless backhaul link with the IAB donor node, but also for wireless backhaul link with the one or more IAB nodes that are linked to the subsequent IAB node. This form of wireless linking between IAB nodes can be repeated a number of times.

In this way, as long as the IAB donor node has a backhaul, e.g., a fiber optics cable connection, a microwave relay connection, an alternative access vendor (AAV) connection, and/or so forth to the core network of a wireless carrier network, all of the other wirelessly linked IAB nodes may "share" this backhaul of the donor node to connect to the core network. This means that if there are sufficient wireless signal bandwidths available, new IAB nodes can be deployed in a geographical area quickly and without the costly installation of fiber optic backhaul connections to the core network for each new base station. Also, the ongoing maintenance recurring cost for such fiber optic backhaul connections can be eliminated.

In one scenario, new IAB base stations can be deployed on a temporary basis, such as to support communication during special events, to support communication during disaster recovery after a man-made or natural disaster, or to temporarily extend outdoor communication coverage to indoors. Currently, 3GPP Release 16 specifies the use of time division duplex (TDD) bands for IAB. TDD is configured to provide uplink and downlink communication within the same radio channel (frequency band). However, in instances where TDD bands are in the millimeter wave range (as is often the case in urban environments where the increased transmission bandwidth of millimeter wave radio signals is desired), the deployment of base stations using IAB may become prohibitively expensive due to the short range and low obstacle penetration ability of the millimeter wave radio signals. For example, any deployment of IAB base stations in an urban environment using millimeter wave TDD bands may require the installation of hundreds or even thousands of IAB nodes with clear line-of-sight to each other just to cover a relatively small geographical area.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
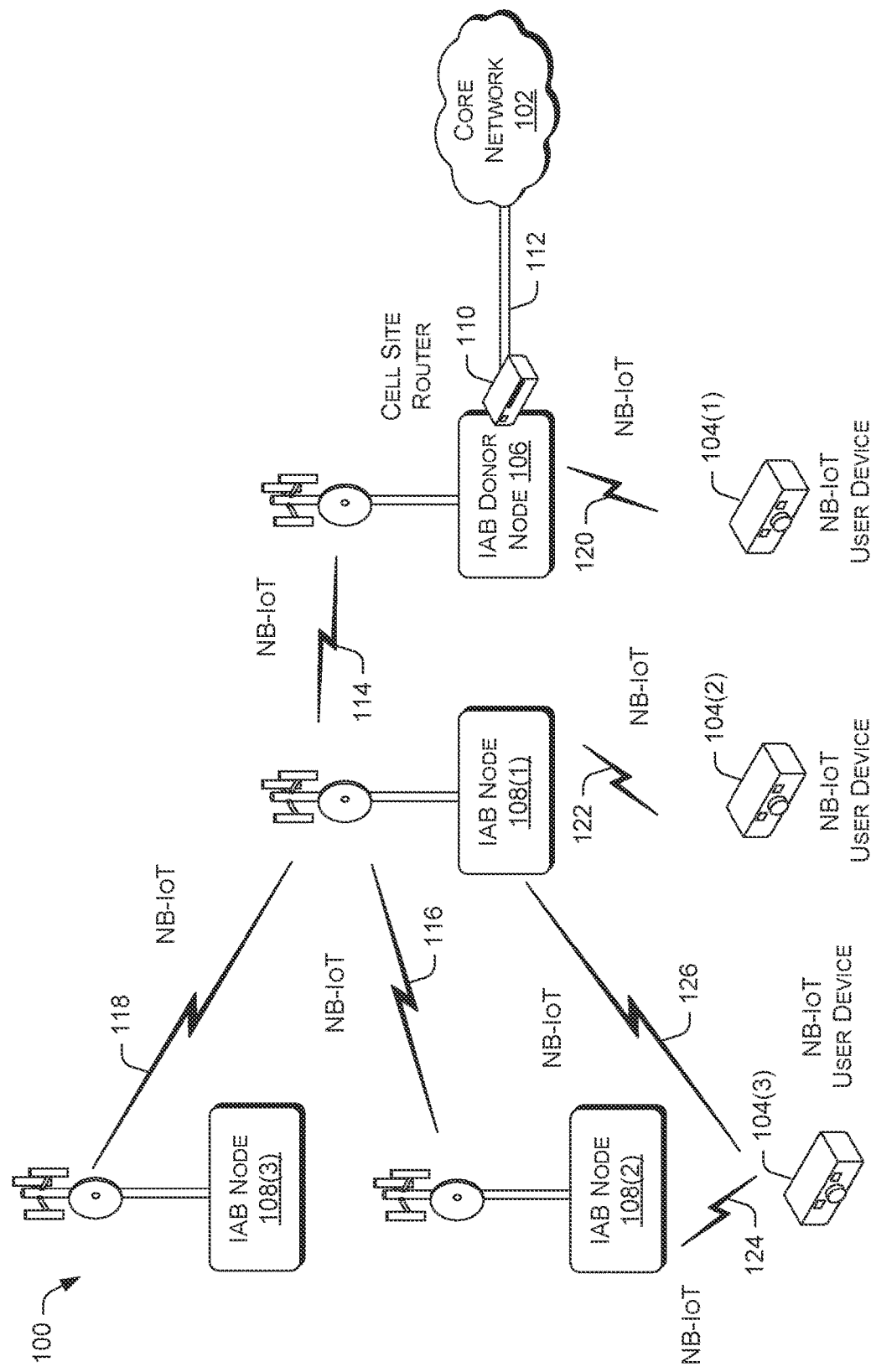
FIG. 1 illustrates an example architecture that uses Narrow Band Internet-of-Things (NB-IoT) carriers to deploy extended integrated access and backhaul (IAB) coverage.

This disclosure is directed to using Narrow-Band Internet-of-Things (NB-IoT) carriers in conjunction with frequency division duplex (FDD) carriers and time division duplex (TDD) carriers for integrated access and backhaul (IAB) implementation. These carriers may be used to deploy an IAB donor node and wirelessly linked IAB nodes. A carrier is a wireless communication connection that is assigned for use by a piece of equipment to communicate with another piece of equipment, in which the wireless communication connection may use one or more radio frequency blocks. Further, while TDD communication technology uses a single radio channel for both uplink and downlink communication, FDD communication technology is designed to constantly devote one radio channel to uplink communication and another radio channel to downlink communication. In some deployments, the NB-IoT carriers may be carriers that use 4G Long-Term Evolution (LTE) frequency bands.

In some embodiments, NB-IoT carriers may be used for wireless backhaul links between IAB base stations, which include an IAB donor node and one or more downstream IAB nodes. NB-IoT carriers may be further used for wireless access links between the IAB base stations and NB-IoT user devices. Although such NB-IoT links have very limited bandwidth, the rapid deployment of such IAB base stations may allow the quick extension of NB-IoT network coverage to remote areas to support the operations of NB-IoT user devices. For example, the NB-IoT network coverage may support the operations of an NB-IoT tracking device over a remote area or a stationary NB-IoT sensor that is installed in a remote location.

In other embodiments, NB-IoT carriers may be used in conjunction with FDD carriers and/or TDD carriers for IAB implementation. In such embodiments, FDD carriers are used for the wireless backhaul links between the IAB base stations, which include an IAB donor node and one or more downstream IAB nodes. Additionally, NB-IoT carriers, FDD carriers, and TDD carriers may be used in various combinations for wireless access links between the IAB base stations and user devices. The user devices may include NB-IoT user devices (e.g., tracking devices, sensors, etc.), as well as conventional non-NB-IoT user devices, which are referred to herein as wireless user devices (e.g., smartphones, vehicle infotainment systems, unmanned aerial vehicles (UAVs), etc.). While the FDD carriers generally have greater signal ranges than the TDD carriers due to lower frequencies, the TDD carriers have greater transmission bandwidths than the FDD carriers. Further, NB-IoT carriers may have greater signal ranges than either the FDD carriers or the TDD carriers, while having less transmission bandwidths than either the FDD carriers or the TDD carriers.

The switching between the use of NB-IoT, FDD, and TDD carriers, as well as carrier aggregation based on these carriers, may be performed by an IAB base station based on available types of carriers, available bandwidths of the carriers, data throughput utilization by the user devices, and/or so forth. However, such switching and aggregation will always preserve a predetermined amount of the low-band FDD carrier bandwidth for the operations of the wireless backhaul links between the IAB node and downstream IAB nodes, as well as prioritize the use of the NB-IoT carriers by NB-IoT user devices, and the use of FDD carriers for the wireless access links of wireless user devices that are relatively far away (e.g., not within range of the IAB base station to establish wireless access links via TDD carriers.). In some embodiments, multiple IAB base stations may coordinate carrier aggregation such that a wireless user device is able to use a TDD carrier to wirelessly link to a first IAB base station that is close while at the same time use an FDD carrier and/or an NB-IoT carrier to wirelessly link to a second IAB base station.

In some instances, an NB-IoT carrier may be used by an IAB base station as a last resort wireless access link for a wireless user device despite the limited bandwidth of the NB-IoT carrier. For example, a wireless user device that is deep inside a building or in a remote location may be unable to establish a wireless access link with an IAB base station via an FDD carrier or a TDD carrier for voice or multimedia communication, but is still able to establish a wireless access link via an NB-IoT carrier for text messaging. This can be advantageous in disaster situations, such as during earthquake rescue or other rescue operations. The techniques described herein may be implemented in a number of ways. Example implementations are provided below with reference to the following FIGS. 1-7.

Example NB-IoT Carriers Architecture

FIG. 1 illustrates an example architecture 100 that uses NB-IoT carriers to deploy IAB coverage. The architecture 100 may include a core network 102 that is part of a wireless carrier network operated by a mobile network operator (MNO). The wireless carrier network may further include radio access networks (RANs). Each of the RANs may be comprised of multiple base stations. Each of the base stations may provide a corresponding network cell that delivers telecommunication and data communication coverage. The core network 102 may use the network cells to provide wireless communication services to user devices. The core network 102 may include components that support 2G and 3G voice communication traffic, as well as 3G, 4G Long Term Evolution (LTE), and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 102 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 102.

Accordingly, the base stations are responsible for handling voice and data traffic between user devices and the core network 102. In some instances, the user devices may include NB-IoT user devices and conventional non-NB-IoT user devices, referred to herein as wireless user devices. The wireless user devices may include mobile phones, tablet computers, etc. The NB-IoT user devices may include tracking devices, sensor devices, embedded computer systems, etc. For example, the NB-IoT user devices may include NB-IoT user devices 104(1)-104(3). A RAN of the wireless carrier network may include IAB base stations. For example, the RAN may include an IAB donor node 106 and IAB nodes 108(1)-108(4). The IAB donor node 106 may be equipped with a cell site router (CSR) 110 that is connected to the core network 102 via a backhaul 112. For example, the backhaul 112 may include a fiber optics cable connection, a microwave relay connection, an AAV connection, and/or so forth.

In various embodiments, NB-IoT carriers may be used for the wireless backhaul links between the IAB donor node 106 and the downstream IAB nodes 108(1)-108(3). For example, the IAB node 108(1) may be wirelessly linked to the IAB donor node 106 via an NB-IoT carrier 114. In turn, the IAB node 108(2) may be wirelessly linked to the IAB node 108(1) via an NB-IoT carrier 116, and the IAB node 108(3) may be wirelessly linked to the IAB node 108(1) via an NB-IoT carrier 118. In various embodiments, the NB-IoT carriers may have a radio frequency of or approximately of 600 to 3000 MHz.

Further, each of the IAB nodes and the IAB donor node may use an NB-IoT carrier to establish a wireless access link between the node and an NB-IoT user device. For example, when the NB-IoT user device 104(1) comes within range of the IAB donor node 106 for the establishment of a wireless access link via an NB-IoT carrier, the IAB donor node 106 may use an NB-IoT carrier 120 to establish the wireless access link. Likewise, when the NB-IoT user device 104(2) comes within range of the IAB node 108(1) for the establishment of a wireless access link via an NB-IoT carrier, the IAB node 108(1) may use an NB-IoT carrier 122 to establish the wireless access link.

However, in instances in which a wireless access link based on a single NB-IoT carrier provides insufficient data transmission bandwidth for the data throughput between a particular IAB node and an NB-IoT user device, the IAB node may establish a supplemental wireless access link via an additional NB-IoT carrier. For example, the NB-IoT user device 104(3) may have a wireless access link with the IAB node 108 that is established via an NB-IoT carrier 124. The NB-IoT user device 104(3) may be receiving a large amount of data via a downlink of a wireless access link and/or sending a large amount of data via an uplink of the wireless access link with the IAB node 108. In such instances, the IAB node 108 may coordinate the establishment of a new NB-IoT carrier between the NB-IoT user device 104(3) and an in-range IAB node to provide supplemental data transmission bandwidth. For example, the IAB node 108(2) may coordinate with the IAB node 108(1) so that a supplemental wireless access link based on a new NB-IoT carrier 126 is established between the IAB node 108(1) and the NB-IoT user device 104(3). Accordingly, the NB-IoT user device 104 may simultaneously use the NB-IoT carrier 124 and the NB-IoT carrier 126 to exchange data with the core network 102. This simultaneous use of multiple carriers is an example of carrier aggregation. The supplemental wireless access link may be used until the IAB node 108(2) determines that the data throughput of the NB-IoT user device 104(3) no longer exceeds the data transmission bandwidth of the NB-IoT carrier 124. At this point, the IAB node 108(2) may coordinate with the IAB node 108(1) to terminate the NB-IoT carrier 126. In this way, carrier aggregation may be activated or deactivated based on the amount of bandwidth utilization by the NB-IoT user device 104(3). While the use of carrier aggregation is discussed in the context of the IAB nodes 108(1) and 108(2), the principles may be similarly applied by the IAB donor node 106 to any NB-IoT user device in coordination with an IAB node.

Example NB-IoT/FDD Carriers Architecture

Figure 2:
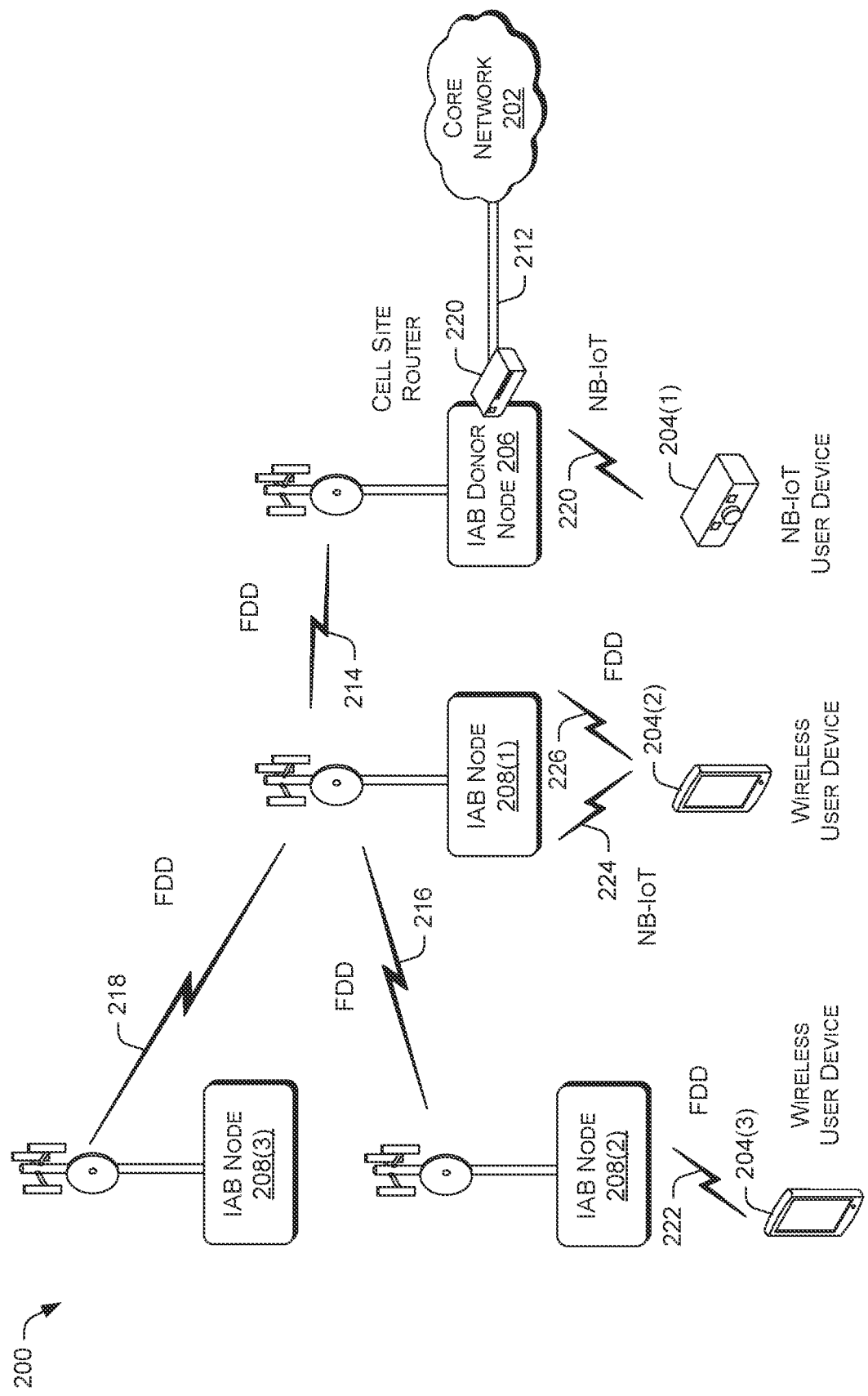
FIG. 2 illustrates an example architecture that uses a combination of NB-IoT carriers and frequency division duplex (FDD) carriers to deploy extended IAB coverage.

FIG. 2 illustrates an example architecture that uses a combination of NB-IoT carriers and frequency division duplex (FDD) carriers to deploy extended IAB coverage. The architecture 200 may include a core network 202 that is identical to the core network 102 described in FIG. 1. The core network 202 may use the network cells of RANs to provide wireless communication services to NB-IoT and wireless user devices. For example, these user devices may include an NB-IoT user device 204(1), a wireless user device 204(2), and a wireless user device 204(3). The wireless user devices may have the ability to use an NB-IoT carrier, an FDD carrier, and a TDD carrier, whether individually or in any combination, to exchange data with the core network 202.

In some embodiments, a RAN of the wireless carrier network may include IAB base stations. For example, the RAN may include an IAB donor node 206 and IAB nodes 208(1)-208(3). The IAB donor node 206 may be equipped with a CSR 210 that is connected to the core network 202 via a backhaul 212. For example, the backhaul 212 may include a fiber optics cable connection, a microwave relay connection, an AAV connection, and/or so forth.

In various embodiments, FDD carriers may be used for the wireless backhaul links between the IAB donor node 206 and the downstream IAB nodes 208(1)-208(3). For example, the IAB node 208(1) may be wirelessly linked to the IAB donor node 206 via an FDD carrier 214. In turn, the IAB node 208(2) may be wirelessly linked to the IAB node 208(1) via an FDD carrier 216, and the IAB node 208(3) may be wirelessly linked to the IAB node 208(1) via an FDD carrier 218. In various embodiments, the FDD carriers may be low-band FDD carriers with a radio frequency of or approximately of 600 MHz or mid-band FDD carriers with a radio frequency of or approximately of 2 GHz.

Further, each of the IAB nodes and the IAB donor node may use an NB-IoT carrier and/or an FDD carrier to establish a wireless access link between the node and a user device. For example, the NB-IoT user device 204(1) may establish a wireless access link with the IAB donor node 206 via an NB-IoT carrier 220 when the NB-IoT user device 204 is within range of the IAB donor node 206. Likewise, the wireless user device 204(3) may establish a wireless access link with the IAB node 208(2) via an FDD carrier 222 when the wireless user device 204(3) is within range of the IAB node 208(2).

In some embodiments, the NB-IoT carriers may have greater signal ranges than the FDD carriers, while the FDD carriers have greater transmission bandwidths than the NB-IoT carriers. For example, the FDD carriers may be mid-band FDD carriers. The greater transmission bandwidths of the FDD carriers means that the FDD carriers provide greater data throughputs than the NB-IoT carriers. Thus, if a wireless user device is relatively close to a particular IAB node, e.g., within range of the IAB node to use either an NB-IoT carrier or an FDD carrier, the particular IAB node may use the FDD carrier for the wireless access link between the particular IAB node and the wireless user device. For example, the wireless user device 204(2) is within range of the IAB node 208(1) to use either an NB-IoT carrier 224 or an FDD carrier 226. In such an example, the IAB node 208(2) may use the FDD carrier 226 to establish a wireless access link between the wireless user device 204(2) and the IAB node 208(1). The wireless access link may enable the wireless user device 204(2) to access the wireless telecommunication services provided by the wireless carrier network.

Conversely, if the wireless user device is relatively far away from a particular IAB node, e.g., only within range of the particular IAB node to use the NB-IoT carrier, the particular IAB node may use the NB-IoT carrier for the wireless access link between the particular IAB node and the wireless user device. For example, the wireless user device 204(2) may be within range of the IAB node 208(1) to use the NB-IoT carrier 224 but not the FDD carrier 226. In such an example, the IAB node 208(1) may use the NB-IoT carrier 224 to establish a wireless access link between the wireless user device 204(2) and the IAB node 208(1).

However, in some instances, a wireless access link based on an FDD carrier may provide insufficient data transmission bandwidth for the data throughput between a particular IAB node and the wireless user device. For example, the wireless user device may be receiving a large amount of data via a downlink of a wireless access link and/or sending a large amount of data via an uplink of the wireless access link with the IAB node. In such instances, the particular IAB node may coordinate the establishment of an NB-IoT carrier between the wireless user device and an in-range IAB node to provide supplemental data transmission bandwidth. For example, the wireless user device 204(2) may be wirelessly linked to the IAB node 208(1) via the FDD carrier 226 when the IAB node 208(1) detects a lack of sufficient data transmission bandwidth for the data throughput between the IAB node 208(1) and the wireless user device 204(2). Accordingly, the IAB node 208(1) may establish the NB-IoT carrier 224 between the IAB node 208(1) and the wireless user device 204(2). This simultaneous use of multiple carriers is an example of carrier aggregation.

In alternative instances, the wireless user device 204(2) may establish an NB-IoT carrier with a different in-range IAB base station, such as the IAB node 208(2) or the IAB donor node 206, rather than establishing the NB-IoT carrier 224. In some implementations, the in-range IAB node that is selected by the particular IAB node for use at any given time may be a node that is able to provide the highest NB-IoT carrier signal strength to the wireless user device. Thus, a wireless user device may switch between using multiple in-range IAB nodes for the NB-IoT carrier depending on the corresponding NB-IoT carrier signal strengths of the multiple in-range IAB nodes. Such carrier aggregation may provide an additional wireless access link that supplements the existing wireless access link between the particular IAB node and the wireless user device.

In some implementations, the wireless user device (e.g., the wireless user device 204(2)) may use the additional wireless access link provided by the NB-IoT carrier (e.g., the NB-IoT carrier 224) until the IAB node 208(1) determines that the data throughput no longer exceeds the data transmission bandwidth of the FDD carrier 226. As a result, carrier aggregation may be activated or deactivated based on the amount of bandwidth utilization by the wireless user device. Furthermore, an IAB node or an IAB donor may also perform carrier aggregation of multiple carriers for an NB-IoT user device, such as the NB-IoT user device 204(1), in a similar manner as a described in FIG. 1. In the above embodiments, the use of NB-IoT carriers vs. wider bandwidth FDD carriers for wireless access links in different situations, as well as the use of carrier aggregation, are discussed in the context of the IAB nodes 208(1). However, the principles may be similarly applied by the IAB donor node 206 or the other IAB nodes to any user device.

Example NB-IoT/FDD/TDD Carriers Architecture

Figure 3:
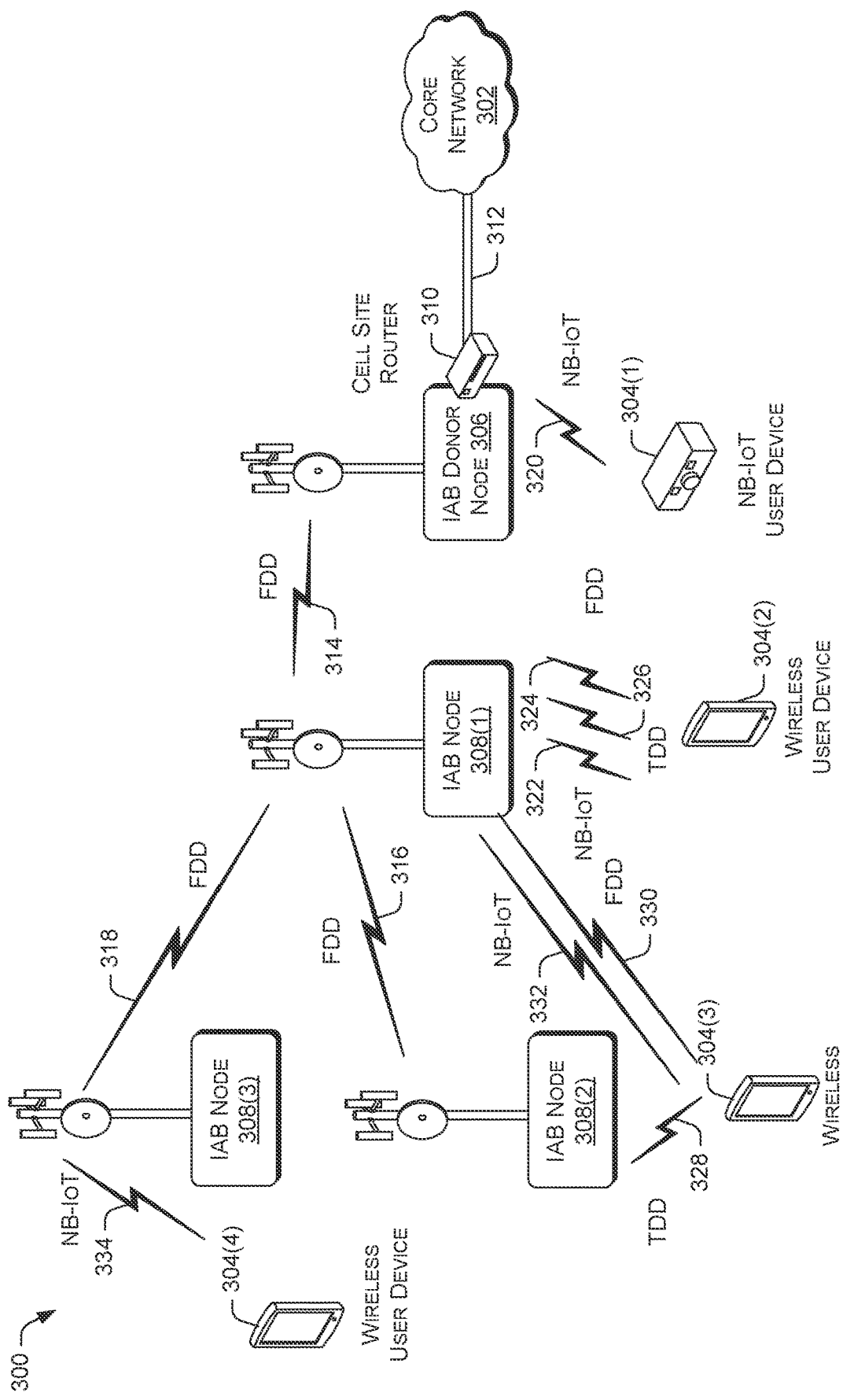
FIG. 3 illustrates an example architecture that uses a combination of NB-IoT carriers, FDD carriers, and time division duplex (TDD) carriers to deploy extended IAB coverage.

FIG. 3 illustrates an example architecture that uses a combination of NB-IoT carriers and frequency division duplex (FDD) carriers to deploy extended IAB coverage. The architecture 300 may include a core network 302 that is identical to the core network 102 described in FIG. 1. The core network 302 may use the network cells of RANs to provide wireless communication services to NB-IoT and wireless user devices. For example, these user devices may include an NB-IoT user device 304(1), a wireless user device 304(2), and a wireless user device 304(3). The wireless user devices may have the ability to use an NB-IoT carrier, an FDD carrier, and a TDD carrier, whether individually or in any combination, to exchange data with the core network 302.

In some embodiments, a RAN of the wireless carrier network may include IAB base stations. For example, the RAN may include an IAB donor node 306 and IAB nodes 308(1)-308(3). The IAB donor node 306 may be equipped with a CSR 310 that is connected to the core network 302 via a backhaul 312. For example, the backhaul 312 may include a fiber optics cable connection, a microwave relay connection, an AAV connection, and/or so forth.

In various embodiments, FDD carriers may be used for the wireless backhaul links between the IAB donor node 306 and the downstream IAB nodes 308(1)-308(3). For example, the IAB node 308(1) may be wirelessly linked to the IAB donor node 306 via an FDD carrier 314. In turn, the IAB node 308(2) may be wirelessly linked to the IAB node 308(1) via an FDD carrier 316, and the IAB node 308(3) may be wirelessly linked to the IAB node 308(1) via an FDD carrier 318. In various embodiments, the FDD carriers may be low-band FDD carriers with a radio frequency of or approximately of 600 MHz or mid-band FDD carriers with a radio frequency of or approximately of 2 GHz.

Further, each of the IAB nodes and the IAB donor node may use an NB-IoT carrier, an FDD carrier, and/or a TDD carrier to establish a wireless access link between the node and a user device. For example, the NB-IoT user device 304(1) may establish a wireless access link with the IAB donor node 306 via an NB-IoT carrier 320 when the NB-IoT user device 304 is within range of the IAB donor node 306.

In some embodiments, the NB-IoT carriers may have greater signal ranges than the FDD and TDD carriers, while the FDD carriers and TDD carriers have greater transmission bandwidths than the NB-IoT carriers. For example, the FDD carriers may be mid-band FDD carriers with a radio frequency of or approximately of 2 GHz, and the TDD carriers may have a radio frequency of or approximately of 3 GHz. The greater transmission bandwidths of the FDD and TDD carriers means that the FDD and TDD carriers provide greater data throughputs than the NB-IoT carriers. However, an IAB node may be configured to prioritize the use of TDD carriers over FDD carriers in order to preserve FDD carrier bandwidth for the wireless backhaul links between the IAB base stations.

Thus, if a wireless user device is relatively close to a particular IAB node, e.g., within range of the IAB node to use an NB-IoT carrier, an FDD carrier, or a TDD carrier, the particular IAB node may use the TDD carrier for the wireless access link between the particular IAB node and the wireless user device. For example, the wireless user device 304(2) is within range of the IAB node 308(1) to use an NB-IoT carrier 322, an FDD carrier 226, and a TDD carrier 326. In such an example, the IAB node 308(2) may use the TDD carrier 326 to establish a wireless access link between the wireless user device 304(2) and the IAB node 308(1). The wireless access link may enable the wireless user device 304(2) to access the wireless telecommunication services provided by the wireless carrier network.

Conversely, if the wireless user device is relatively far away from a particular IAB node, e.g., only within range of the particular IAB node to use the NB-IoT carrier, the particular IAB node may use the NB-IoT carrier for the wireless access link between the particular IAB node and the wireless user device. For example, the wireless user device 304(2) may be within range of the IAB node 308(1) to use the NB-IoT carrier 322 but not the FDD carrier 324 or the TDD carrier 326. In such an example, the IAB node 308(1) may use the NB-IoT carrier 322 to establish a wireless access link between the wireless user device 304(2) and the IAB node 308(1).

However, in some instances, a wireless access link based on a TDD carrier may provide insufficient data transmission bandwidth for the data throughput between a particular IAB node and the wireless user device. For example, the wireless user device may be receiving a large amount of data via a downlink of a wireless access link and/or sending a large amount of data via an uplink of the wireless access link with the IAB node. In such instances, the particular IAB node may coordinate the establishment of an FDD carrier between the wireless user device and an in-range IAB node to provide supplemental data transmission bandwidth. For example, the wireless user device 304(2) may be wirelessly linked to the IAB node 308(1) via the TDD carrier 326 when the IAB node 308(1) detects a lack of sufficient data transmission bandwidth for the data throughput between the IAB node 308(1) and the wireless user device 304(2). Accordingly, the IAB node 308(1) may establish the FDD carrier 324 between the IAB node 208(1) and the wireless user device 304(2). This simultaneous use of multiple carriers is an example of carrier aggregation.

In alternative instances, the wireless user device 304(2) may establish an FDD carrier with a different in-range IAB base station, such as the IAB node 308(2) or the IAB donor node 306, rather than establishing the FDD carrier 324. In some implementations, the in-range IAB node that is selected by the particular IAB node for use at any given time may be a node that is able to provide the highest FDD carrier signal strength to the wireless user device. Thus, a particular IAB node may switch between using multiple in-range IAB nodes for the FDD carrier depending on the corresponding FDD carrier signal strengths of the multiple in-range IAB nodes. Such carrier aggregation may provide an additional wireless access link that supplements the existing wireless access link between the particular IAB node and the wireless user device.

In some implementations, the wireless user device (e.g., the wireless user device 304(2)) may use the additional wireless access link provided by the FDD carrier (e.g., the FDD carrier 324) until the IAB node 308(1) determines that the data throughput no longer exceeds the data transmission bandwidth of the TDD carrier 326. As a result, carrier aggregation may be activated or deactivated based on the amount of bandwidth utilization by the wireless user device.

There may be additional instances in which the combination of a TDD carrier and an FDD carrier may nevertheless provide insufficient data transmission bandwidth for the data throughput between a particular IAB node and the wireless user device. For example, if the combination of the TDD carrier 326 and the FDD carrier 324 is sufficient for the data transmission throughput of the wireless user device 304(2), the IAB node 308(1) may arrange for the establishment of an additional wireless access link via the NB-IoT carrier 322 in the same manner as was done for the FDD carrier 324. The NB-IoT carrier 322 may be used along with FDD carrier 324 and the TDD carrier 326 until the data throughput no longer exceeds the data transmission bandwidth provided by the combination of the FDD carrier 324 and the TDD carrier 326. Thus, it is possible for the wireless user device 304(2) to simultaneously use three carriers, (NB-IoT carrier 322, FDD carrier 324, and TDD carrier 326), simultaneously use two carriers (FDD carrier 324 and TDD carrier 326), or just the TDD carrier 326, depending on the data throughput requirements of the wireless user device 304(2).

Further, the multiple carriers that are used by a wireless user device may be provided by different IAB base stations. For example, the wireless user device 304(3) may have a wireless access link with an IAB node 308(2) that is established via a TDD carrier 328. Simultaneously, the wireless user device 304(3) may have a first additional wireless access link with the IAB node 308(1) that is established via an FDD carrier 330, and a second additional wireless access link with the IAB node 308(1) that is established via an NB-IoT carrier 332. However, in alternative instances, the second additional wireless access link of the wireless user device 304(3) may be established with a different IAB node, such as the IAB node 308(3), depending on the signal strengths of the carriers provided by the various IAB nodes. In other words, it is also possible for a single wireless user device to have wireless access links that are based on three carriers (e.g., TDD carrier, FDD carrier, and NB-IoT carrier) with three different IAB base stations, in which the IAB base stations include the IAB donor node 306 and/or multiple IAB nodes.

In some scenarios, a wireless user device may be out of range IAB nodes for establishing FDD and TDD carriers, but the wireless user device may be within range to establish an NB-IoT carrier with an IAB node. For example, the wireless user device 304(4) may use an NB-IoT carrier 334 to establish a wireless access link with the IAB node 308(3). While the wireless user device 304(4) may be unable to use the NB-IoT carrier 334 for voice or multimedia communication, the wireless user device 304(3) can still use the NB-IoT carrier 334 for text messaging. Furthermore, an IAB node or an IAB donor may also perform carrier aggregation of multiple carriers for an NB-IoT user device, such as the NB-IoT user device 304(1), in a similar manner as a described in FIG. 1. In the above embodiments, the use of NB-IoT carriers, FDD carriers, and TDD carriers for wireless access links in different situations, as well as the use of carrier aggregation, are discussed in the context of the IAB nodes. However, the principles may be similarly applied by the IAB donor node 306.

Example IAB Donor Node and Node Components

Figure 4:
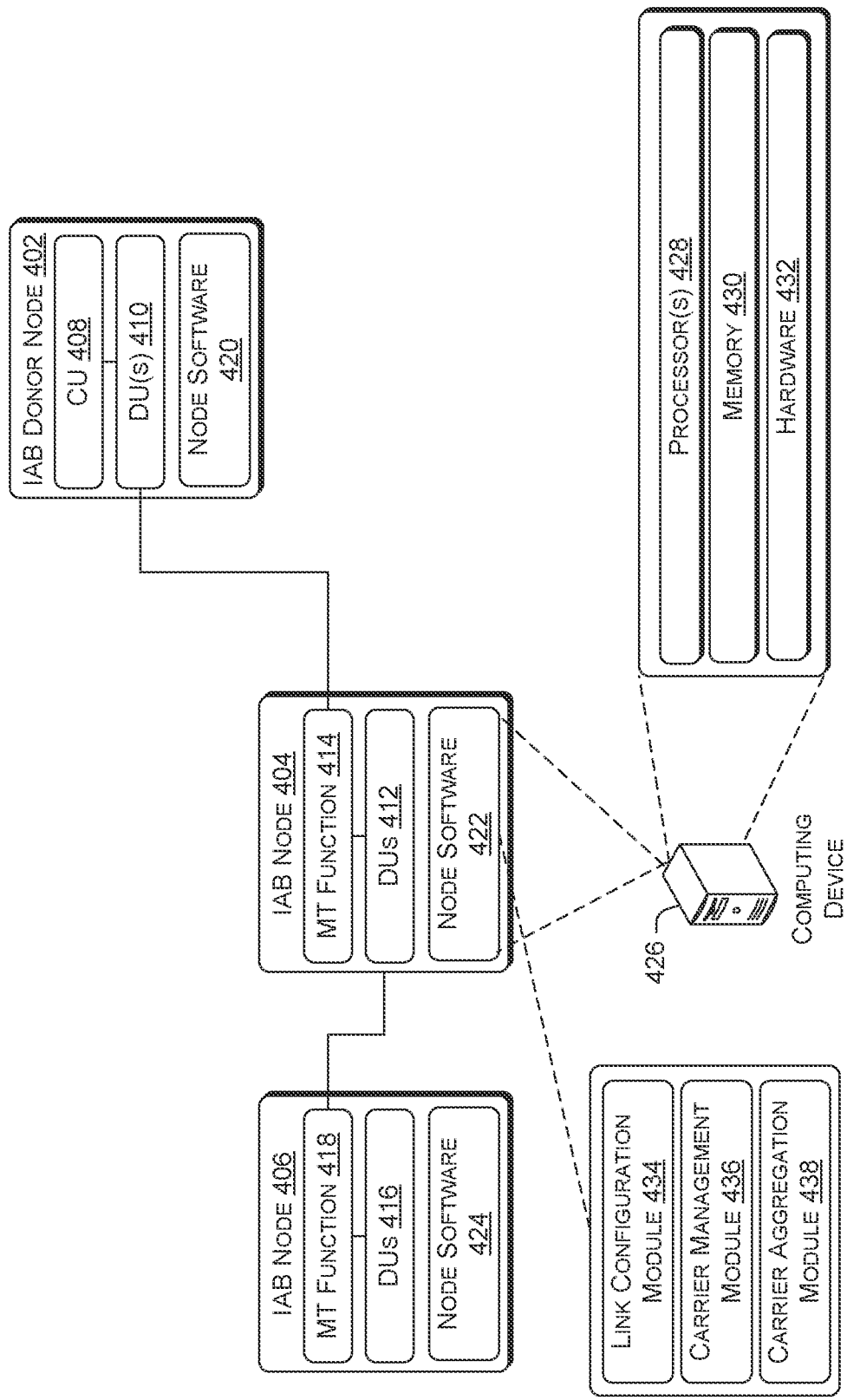
FIG. 4 is a block diagram showing various components of an IAB donor node and IAB nodes in an NB-IoT-based IAB deployment.

FIG. 4 is a block diagram showing various components of an IAB donor node and IAB nodes in an NB-IoT-based IAB deployment. In the illustrative IAB chain shown, the IAB donor node 402 may be linked to an IAB node 404, which in turn is linked to an IAB node 406. The IAB donor node 402 may have a split architecture that is divided between a central unit (CU) 408 and one or more distributed units (DUs) 410. The CU 408 is a logical node that hosts various control protocols to interface with the core network (e.g., the core network 102) of a wireless carrier network, as well as to control the operations of the DUs 410. For example, the protocols may include the radio resource control (RRC) protocol, the service data adaption protocol (SDAP), the packet data convergence protocol (PDCP), and/or so forth. In turn, the DUs 410 may be logical nodes that are equipped with radios of multiple frequency bands that use different communication techniques (e.g., FDD, TDD, NB-IoT, etc.) to interface with user devices. These radios may also cover different air interface sectors and/or geographical areas. For example, the DUs 410 may perform radio link control (RLC), medium access control (MAC), and/or other functions with respect to user devices. The CU 408 may interface with and control the DUs 410 via one or more F1 interfaces.

In contrast, an IAB node may be equipped with one or more DUs but lacks a CU. Instead, the IAB node may be equipped with a mobile termination (MT) function unit that is connected to its own DUs. The MT function of the IAB node may enable the IAB node to interface with a DU of an IAB node or an IAB donor node that is further up the IAB chain. For example, the IAB node 404 may include one or more DUs 412 and an MT function 414. Likewise, the IAB node 406 may include one or more DUs 416 and an MT function 418. Each IAB node may initially connect to an IAB donor node or an IAB node up the chain as a user device. Once connected, the IAB node may be configured by the IAB donor node or the IAB node up the chain to function as the next IAB link in the chain.

In various embodiments, the IAB donor and each IAB may be equipped with node software that performs various IAB and cell site functions, including the MT functions, user device connection functions, user device handover functions, etc. For example, the IAB donor node 402 may be equipped with node software 420, the IAB node 404 may be equipped with node software 422, and the IAB node 406 may be equipped with node software 424. The node software of each node may be stored in a memory of a computing device and executed by one or more processors. For the purpose of illustration, the node software 422 of the IAB node 404 is illustrated as being executed by a computing device 426. However, it will be appreciated that other IAB nodes and the IAB donor node may be equipped with similar computing devices. The computing device 426 may be a general-purpose computer, a server, or another electronic device that is capable of receiving data input, processing the data input, and generating output data. In other embodiments, the computing device 426 may be a virtual computing device in the form of a virtual machine or a software container that is hosted in a cloud.

The computing device 426 may include one or more processors 428, device hardware 432, and memory 430. The memory 430 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

As an illustrative example, the node software 422 of the IAB node 404 may include a link configuration module 434, a carrier management module 436, and a carrier aggregation module 438. With respect to the architecture 100, the link configuration module 434 may coordinate with the MT function of an IAB node to establish a wireless backhaul link following an initial connection. The wireless backhaul link may be configured according to a set of one or more predetermined configuration settings stored in the link configuration module 434. For example, the link configuration module 434 may coordinate with the MT function to establish an NB-IoT carrier with the IAB node.

The carrier management module 436 may coordinate the wireless access links between an NB-IoT user device and the IAB node. In some embodiments, the carrier management module 436 may determine whether an NB-IoT user device is within range to use an NB-IoT carrier based on a signal strength of a radio signal from the NB-IoT user device as received by the IAB node, such as a radio signal received on a control channel. Accordingly, if the received signal strength is above a predetermined strength threshold for an NB-IoT carrier, the carrier management module 436 may determine that the NB-IoT is within range to use the NB-IoT carrier.

Alternatively, the carrier management module 436 may determine whether an NB-IoT user device is within range based on a distance between the NB-IoT user device and the IAB node. For example, the carrier management module 436 may use the control channel to send a query for a geolocation (e.g., global positioning system (GPS) location) of the NB-IoT user device, and then compare the geolocation of the NB-IoT user device to a geolocation of the IAB node to determine a distance. The distance is then compared by the carrier management module 436 to a predetermined distance threshold for the NB-IoT carrier. The carrier management module 436 may determine that the NB-IoT user device is within range to use the NB-IoT carrier when the distance is within the predetermined distance threshold.

The carrier aggregation module 438 may coordinate the use of multiple carriers by a single NB-IoT user device. The NB-IoT user device may include hardware and/or software components that support the use of multiple NB-IOT carriers to simultaneously carry uplink and downlink communication traffic. In various embodiments, the carrier aggregation module 438 may be configured to supplement the use of an NB-IoT carrier with another NB-IoT carrier. For example, an NB-IoT user device may be using an existing NB-IoT carrier as a wireless access link between the user and the IAB node. However, the existing NB-IoT carrier may provide insufficient data transmission bandwidth for the data throughput between the IAB node and the NB-IoT user device. For example, the IAB node may determine that the FDD carrier is providing insufficient data transmission bandwidth when corresponding data of the NB-IoT user device overflows into an overflow buffer of the IAB node, when a data packet loss of the data for the NB-IoT user device exceeds a predetermined loss threshold at the IAB node, when data transmission latency of the data for the NB-IoT user device exceeds a latency threshold, and/or so forth. In such instances, the IAB node may coordinate the establishment of a new NB-IoT carrier between the NB-IoT user device and an in-range IAB node to provide supplemental data transmission bandwidth.

The in-range IAB node may be a node other than the IAB node that is able to provide the highest NB-IoT carrier signal strength to the NB-IoT user device. For example, the in-range IAB node may be the IAB donor node or a backhaul linked IAB node that is upstream or downstream to the IAB node. In various embodiments, the in-range IAB node that is able to provide the highest NB-IoT carrier signal strength may be an in-range IAB that is receiving a strongest radio signal from the NB-IoT user device or which is closest in distance to the NB-IoT user device.

The carrier aggregation module 438 of the IAB node may coordinate with a carrier aggregation module of the in-range IAB to set up a supplemental NB-IoT carrier. The coordination may be performed in a peer-to-peer manner via control channel communication (e.g., RLC channel) between the nodes. Alternatively, the coordination may be performed by the IAB node in conjunction with a network switching function of a core network. The coordination performed by the carrier aggregation module 438 may include the synchronization of the multiple NB-IoT carriers to duplex uplink and downlink communication traffic between an NB-IoT user device and the IAB nodes. For example, a carrier traffic synchronization algorithm of the carrier aggregation module 438 may work in conjunction with a counterpart synchronization algorithm on an NB-IoT user device, and/or synchronization algorithms of the other IAB node to perform the duplexing. While the operations of the modules are described above in the context of the IAB node 404, it will be appreciated that the node software of the example IAB donor node 402 and the example IAB donor node 406 may function in a similar manner.

With respect to the architecture 200, the link configuration module 434 may coordinate with the MT function of an IAB node to establish a wireless backhaul link following an initial connection. The wireless backhaul link may be configured according to a set of one or more predetermined configuration settings stored in the link configuration module 434. For example, the link configuration module 434 may coordinate with the MT function to establish an FDD carrier with the IAB node.

The carrier management module 436 may coordinate the wireless access links between a user device and the IAB node. In some embodiments, the carrier management module 436 may determine whether a user device is within range to use an FDD carrier or an NB-IoT carrier based on a type of the user device (e.g., NB-IoT user device vs. wireless user device), a signal strength of a radio signal from the user device as received by the IAB node, such as a radio signal received on a control channel. While the wireless user devices are capable of using either NB-IoT carriers, FDD carriers, or TDD carriers, the NB-IoT user devices are only capable of using NB-IoT carriers. Accordingly, if the received signal strength is above a predetermined strength threshold for a particular form of carrier usable by a particular type of user device, the carrier management module 436 may determine that the user device is within range to use the particular form of carrier.

Alternatively, the carrier management module 436 may determine whether a user device is within range based on a distance between the user device and the IAB node. For example, the carrier management module 436 may use the control channel to send a query for a geolocation (e.g., global positioning system (GPS) location) of the user device, and then compare the geolocation of the user device to a geolocation of the IAB node to determine a distance. The distance is then compared by the carrier management module 436 to a predetermined distance threshold for the particular form of carrier. The carrier management module 436 may determine that the user device is within range to use the particular form of carrier when the distance is within the predetermined distance threshold.

Thus, since an NB-IoT signal has a greater signal range than an FDD signal, the carrier management module 436 may initially establish a wireless access link with a wireless user device via the NB-IoT carrier as the user device approaches the IAB node. However, as the user device moves closer and comes into range to use the FDD carrier, the carrier management module 436 may switch to using the FDD carrier for the wireless access link. Conversely, as the wireless user device moves farther away and out of the range for the use of the FDD carrier, the carrier management module 436 may once again switch to using the NB-IoT carrier for the wireless access link. However, no such switching is performed by the carrier management module 436 for NB-IoT user devices, as those devices can only use NB-IoT carriers.

In some embodiments, the carrier management module 436 may be configured to preserve a predetermined amount of the FDD carrier bandwidth for the wireless backhaul links between the IAB node and downstream IAB nodes. Accordingly, the carrier management module 436 may suspend the establishment of any FDD carriers for wireless access links between the IAB node and wireless user devices when an available amount of FDD carrier bandwidth at the IAB node falls below a minimum bandwidth threshold. The suspension of the FDD carrier establishment may remain in place until the carrier management module 436 determines that the available amount of the FDD carrier bandwidth is at or above the minimum bandwidth threshold.

The carrier aggregation module 438 may coordinate the use of multiple carriers by a single user device. The user device may include hardware and/or software components that support the use of multiple carriers of the same type, or multiple types of carriers of different frequencies, to simultaneously carry uplink and downlink communication traffic. In various embodiments, the carrier aggregation module 438 may be configured to supplement the use of an FDD carrier with an NB-IoT carrier. For example, a wireless user device may be using the FDD carrier as a wireless access link between the user and the IAB node. However, the FDD carrier may provide insufficient data transmission bandwidth for the data throughput between the IAB node and the wireless user device. For example, the IAB node may determine that the FDD carrier is providing insufficient data transmission bandwidth when corresponding data of the wireless user device overflows into an overflow buffer of the IAB node, when a data packet loss of the data for the wireless user device exceeds a predetermined loss threshold at the IAB node, when data transmission latency of the data for the wireless user device exceeds a latency threshold, and/or so forth. In such instances, the IAB node may coordinate the establishment of a new NB-IoT carrier between the wireless user device and an in-range IAB node to provide supplemental data transmission bandwidth.

The in-range IAB node may be a node that is able to provide the highest NB-IoT carrier signal strength to the user device. For example, the in-range IAB node may be the IAB node, the IAB donor node, or a backhaul linked IAB node that is upstream or downstream to the IAB node. In various embodiments, the in-range IAB node that is able to provide the highest NB-IoT carrier signal strength may be an in-range IAB that is receiving a strongest radio signal from the wireless user device or which is closest in distance to the wireless user device.

In instances in which the in-range IAB node that provides an NB-IoT carrier for a supplemental wireless access link is an IAB donor node, a downstream IAB, or an upstream IAB node rather than the IAB node itself, the carrier aggregation module 438 of the IAB node may coordinate with the carrier aggregation module of the in-range IAB to set up a supplemental NB-IoT carrier. The coordination may be performed in a peer-to-peer manner via control channel communication (e.g., RLC channel) between the nodes. Alternatively, the coordination may be performed by the IAB node in conjunction with a network switching function of a core network. The coordination performed by the carrier aggregation module 438 may include the synchronization of the NB-IoT carrier and the FDD carrier to duplex uplink and downlink communication traffic between a wireless user device and one or more IAB nodes, or the synchronization of multiple NB-IoT carriers to duplex uplink and downlink communication traffic between a NB-IoT user device and one or more IAB nodes. For example, a carrier traffic synchronization algorithm of the carrier aggregation module 438 may work in conjunction with a counterpart synchronization algorithm on a user device, and/or synchronization algorithms of one or more additional IAB nodes to perform the duplexing. While the operations of the modules are described above in the context of the IAB node 404, it will be appreciated that the node software of the example IAB donor node 402 and the example IAB donor node 406 may function in a similar manner.

With respect to the architecture 300, the link configuration module 434 may coordinate with the MT function of an IAB node to establish a wireless backhaul link following an initial connection. The wireless backhaul link may be configured according to a set of one or more predetermined configuration settings stored in the link configuration module 434. For example, the link configuration module 434 may coordinate with the MT function to establish an FDD carrier with the IAB node.

The carrier management module 436 may coordinate the wireless access links between a user device and the IAB node. In some embodiments, the carrier management module 436 may determine whether a user device is within range to use an FDD carrier, TDD carrier, or an NB-IoT carrier based on a type of the user device (e.g., NB-IoT user device vs. wireless user device), a signal strength of a radio signal from the user device as received by the IAB node, such as a radio signal received on a control channel. While the wireless user devices are capable of using either NB-IoT carriers, FDD carriers, or TDD carriers, the NB-IoT user devices are only capable of using NB-IoT carriers. Accordingly, if the received signal strength is above a predetermined strength threshold for a particular form of carrier usable by a particular type of user device, the carrier management module 436 may determine that the user device is within range to use the particular form of carrier.

Alternatively, the carrier management module 436 may determine whether a user device is within range based on a distance between the user device and the IAB node. For example, the carrier management module 436 may use the control channel to send a query for a geolocation (e.g., global positioning system (GPS) location) of the user device, and then compare the geolocation of the user device to a geolocation of the IAB node to determine a distance. The distance is then compared by the carrier management module 436 to a predetermined distance threshold for the particular form of carrier. The carrier management module 436 may determine that the user device is within range to use the particular form of carrier when the distance is within the predetermined distance threshold.

Thus, since an NB-IoT signal has a greater signal range than a TDD signal, the carrier management module 436 may initially establish a wireless access link with a wireless user device via the NB-IoT carrier as the wireless user device approaches the IAB node. However, as the wireless user device moves closer and comes into range to use the TDD carrier, the carrier management module 436 may switch to using the TDD carrier for the wireless access link. Conversely, as the wireless user device moves farther away and out of the range for the use of the TDD carrier, the carrier management module 436 may once again switch to using the NB-IoT carrier for the wireless access link.

Alternatively, the carrier management module 436 may perform the switch between the NB-IoT carrier and an FDD carrier in a similar manner. However, no such switching is performed by the carrier management module 436 for NB-IoT user devices, as those devices can only use NB-IoT carriers. In some embodiments, the carrier management module 436 may be configured to preserve a predetermined amount of the FDD carrier bandwidth for the wireless backhaul links between the IAB node and downstream IAB nodes. Accordingly, the carrier management module 436 may suspend the establishment of any FDD carriers for wireless access links between the IAB node and wireless user devices when an available amount of FDD carrier bandwidth at the IAB node falls below a minimum bandwidth threshold. The suspension of the FDD carrier establishment may remain in place until the carrier management module 436 determines that the available amount of the FDD carrier bandwidth is at or above the minimum bandwidth threshold.

The carrier aggregation module 438 may coordinate the use of multiple carriers by a single user device. The user device may include hardware and/or software components that support the use of multiple carriers of the same type, or multiple types of carriers of different frequencies, to simultaneously carry uplink and downlink communication traffic. In various embodiments, the carrier aggregation module 438 may be configured to supplement the use of a TDD carrier with an FDD carrier and/or an NB-IoT carrier. For example, a user device may be using the TDD carrier as a wireless access link between the user and the IAB node. However, the TDD carrier may provide insufficient data transmission bandwidth for the data throughput between the IAB node and the user device. For example, the IAB node may determine that the TDD carrier is providing insufficient data transmission bandwidth when corresponding data of the user device overflows into an overflow buffer of the IAB node, when a data packet loss of the data for the user device exceeds a predetermined loss threshold at the IAB node, when data transmission latency of the data for the user device exceeds a latency threshold, and/or so forth. In such instances, the IAB node may coordinate the establishment of a new FDD carrier, and then the establishment of a new NB-IoT carrier if necessary, between the user device and an in-range IAB node to provide supplemental data transmission bandwidth.

The in-range IAB node may be a node that is able to provide the highest low-band FDD or NB-IoT carrier signal strength to the user device. For example, the in-range IAB node may be the IAB node, the IAB donor node, or a backhaul linked IAB node that is upstream or downstream to the IAB node. In various embodiments, the in-range IAB node that is able to provide the highest low-band FDD carrier signal strength may be an in-range IAB that is receiving a strongest radio signal from the user device or which is closest in distance to the wireless user device.

In instances in which the in-range IAB node that provides an FDD carrier and/or an NB-IoT carrier for a supplemental wireless access link is an IAB donor node, a downstream IAB, or an upstream IAB node rather than the IAB node itself, the carrier aggregation module 438 of the IAB node may coordinate with the carrier aggregation module of the in-range IAB to set up a supplemental FDD carrier and/or a supplemental NB-IoT carrier. The coordination may be performed in a peer-to-peer manner via control channel communication (e.g., RLC channel) between the nodes. Alternatively, the coordination may be performed by the IAB node in conjunction with a network switching function of a core network. The coordination performed by the carrier aggregation module 438 may include the synchronization of the TDD carrier, the FDD carrier, and/or the NB-IoT carrier to duplex uplink and downlink communication traffic between a wireless user device and one or more IAB nodes, or the synchronization of multiple NB-IoT carriers to duplex uplink and downlink communication traffic between a NB-IoT user device and one or more IAB nodes. For example, a carrier traffic synchronization algorithm of the carrier aggregation module 438 may work in conjunction with a counterpart synchronization algorithm on a user device, and/or synchronization algorithms of one or more additional IAB nodes to perform the duplexing. While the operations of the modules are described above in the context of the IAB node 404, it will be appreciated that the node software of the example IAB donor node 402 and the example IAB donor node 406 may function in a similar manner.

Example Processes

Figure 5:
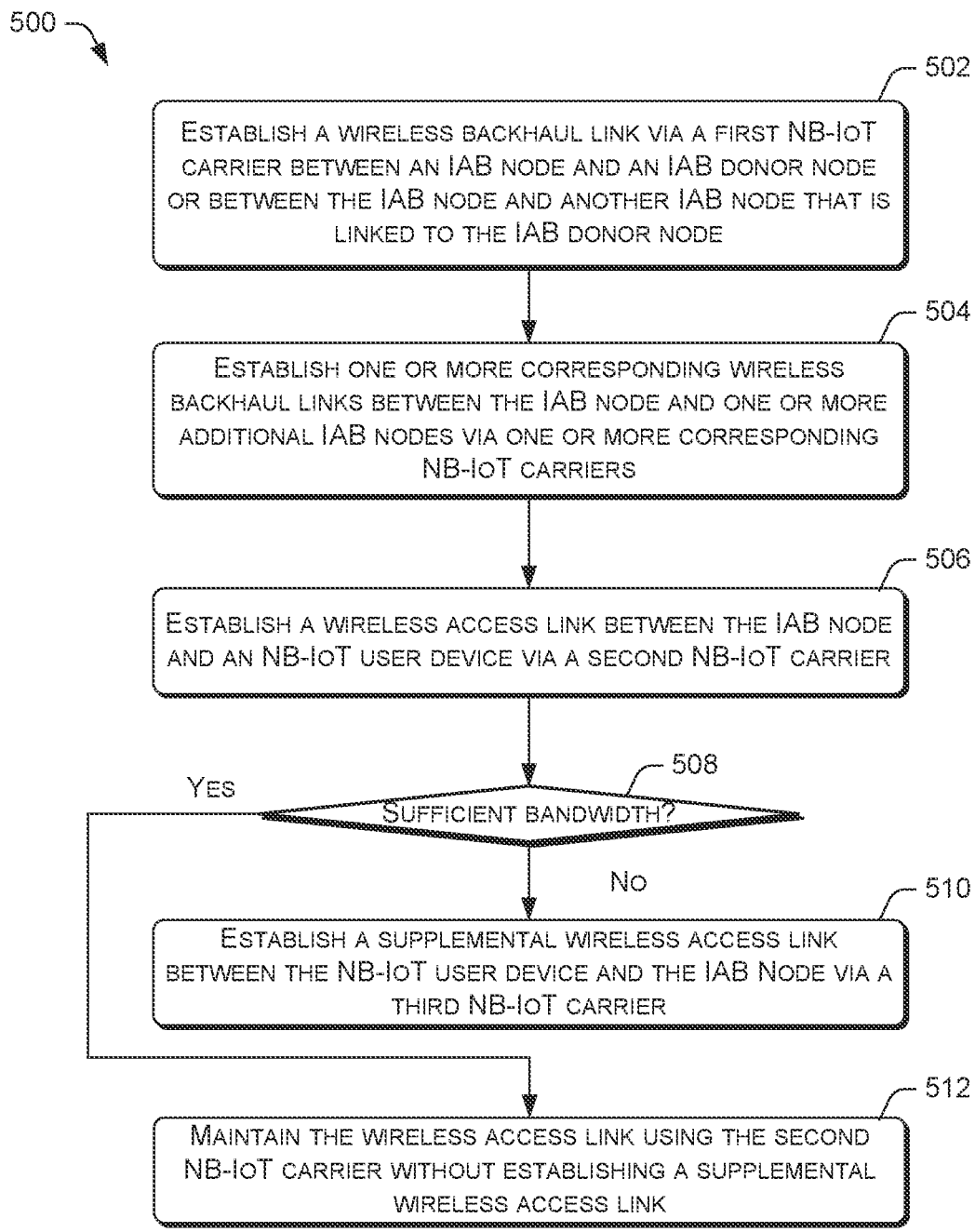
FIG. 5 is a flow diagram of an example process for using NB-IoT carriers to implement wireless backhaul links and wireless access links for an IAB node.
Figure 6:
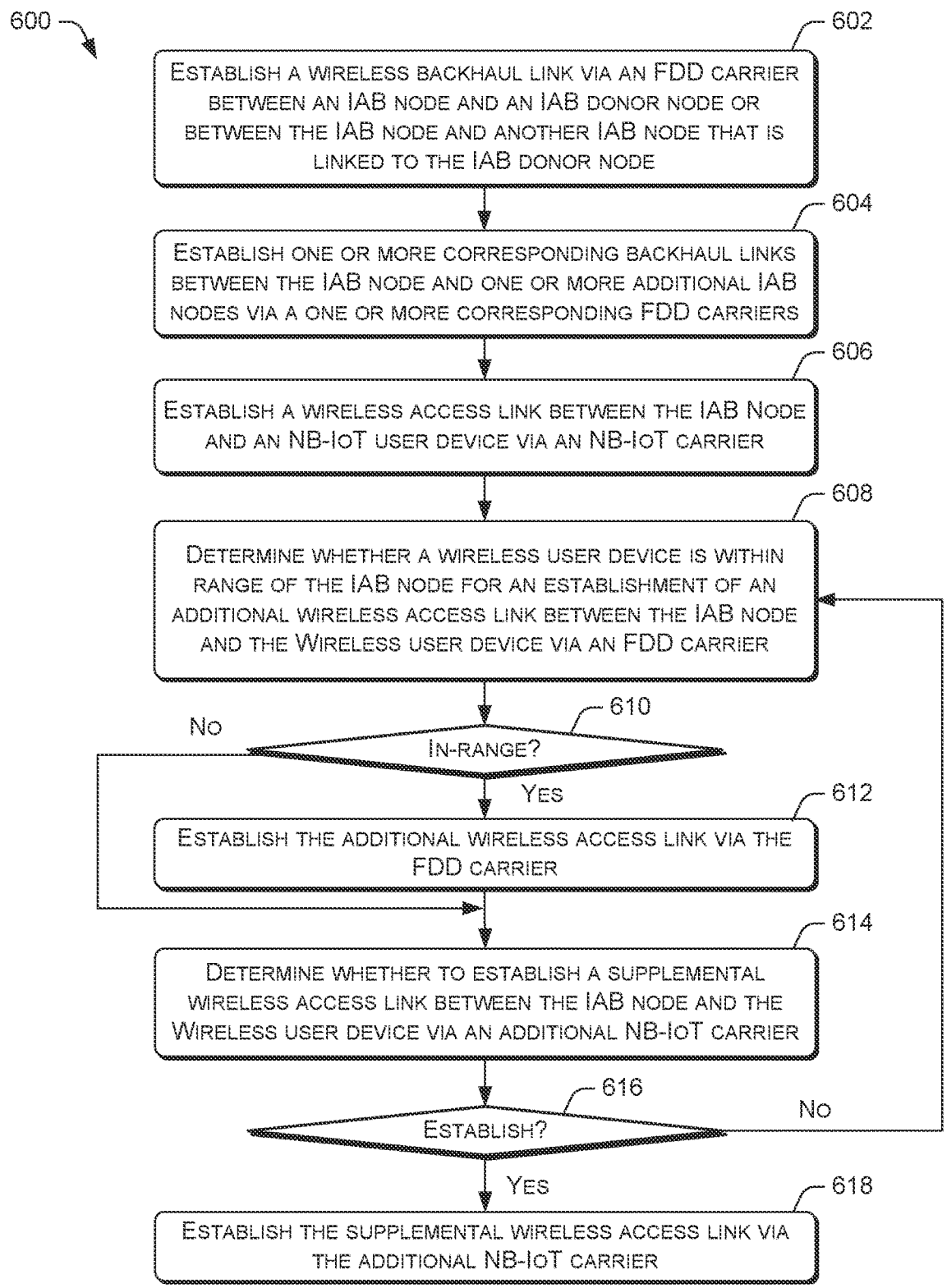
FIG. 6 is a flow diagram of an example process for using a combination of NB-IoT carriers and FDD carriers to implement wireless backhaul links and wireless access links for an IAB node.
Figure 7:
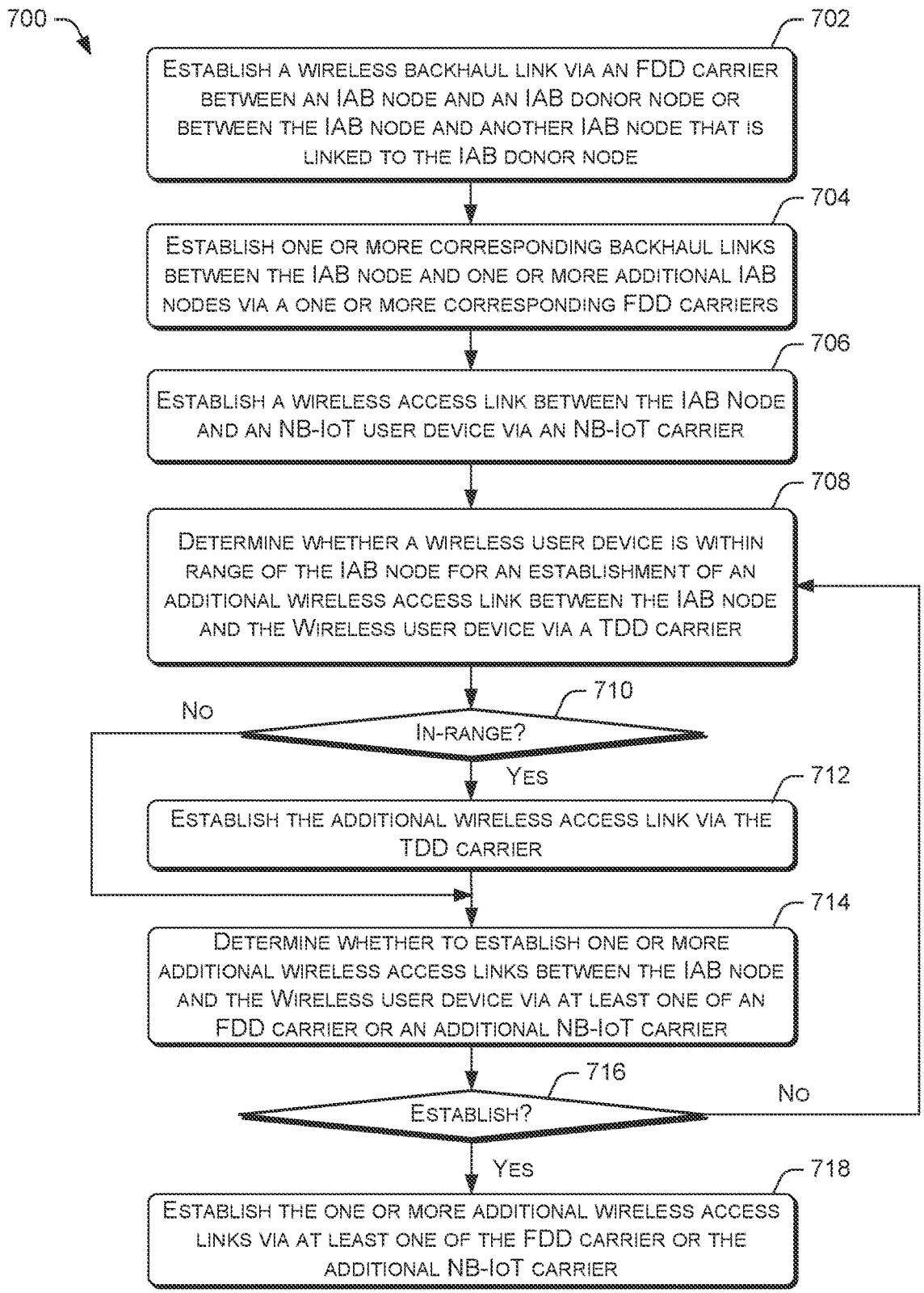
FIG. 7 is a flow diagram of an example process for using NB-IoT carriers in combination with TDD and FDD carriers to implement wireless backhaul links and wireless access links for an IAB node.

FIGS. 5-7 present illustrative processes 500-700 for deploying extended NB-IoT carrier-based IAB coverage. Each of the processes 500-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-700 are described with reference to the architectures 100-300 of FIGS. 1-3, respectively.

FIG. 5 is a flow diagram of an example process 500 for using NB-IoT carriers to implement wireless backhaul links and wireless access links for an IAB node. At block 502, an IAB node may establish a wireless backhaul link via a first NB-IoT carrier between the IAB node and an IAB donor node or between the IAB node and another IAB node that is linked to the IAB donor node. At block 504, the IAB node may establish one or more corresponding wireless backhaul links between the IAB node and one or more additional IAB nodes via one or more corresponding NB-IoT carriers.

At block 506, the IAB node may establish a wireless access link between the IAB node and an NB-IoT user device via a second NB-IoT carrier. At decision block 508, the IAB node may determine whether the NB-IoT carrier provides sufficient bandwidth to the NB-IoT user device. Thus, if the IAB node determines that the NB-IoT carrier is not providing sufficient bandwidth, the process 500 may proceed to block 510. At block 510, the IAB node may establish a supplemental wireless access link between the NB-IoT user device IAB node via a third NB-IoT carrier. However, if the IAB node determines that the NB-IoT is providing sufficient bandwidth, the process 500 may proceed to block 512. At block 512, the IAB node may maintain the wireless access link using the second NB-IoT carrier without establishing a supplemental wireless access link.

FIG. 6 is a flow diagram of an example process 600 for using a combination of NB-IoT carriers and FDD carriers to implement wireless backhaul links and wireless access links for an IAB node. At block 602, an IAB node may establish a wireless backhaul link between the IAB node and the IAB donor node or between the IAB node and another IAB node that is linked to the IAB donor node, in which the wireless backhaul link is established via an FDD carrier. The IAB donor node may have a backhaul, e.g., a fiber optics cable connection, a microwave relay connection, an AAV connection, and/or so forth to a core network of a wireless carrier network.

At block 604, the IAB node may establish one or more corresponding wireless backhaul links between the IAB node and one or more additional IAB nodes via one or more corresponding FDD carriers. Each of the corresponding wireless backhaul links may enable a corresponding IAB node to exchange communication with the core network of the wireless carrier network.

At block 606, the IAB node may establish a wireless access link between the IAB node and an NB-IoT user device via an NB-IoT carrier. At block 608, the IAB node may determine whether a wireless user device is within range of the IAB node to establish an additional wireless access link between the IAB node and the wireless user device via an FDD carrier. At decision block 610, if the IAB node determines that the wireless user device is in-range, the process 600 may proceed to block 612. At block 612, the IAB node may establish the additional wireless access link via the FDD carrier.

At block 614, the IAB node may determine whether to establish a supplemental wireless access link between the IAB node and the wireless user device via an additional NB-IoT carrier. For example, the IAB node may determine that a supplemental wireless access link is to be established when the FDD carrier is unable to provide sufficient data transmission bandwidth for a data throughput between the IAB node and the wireless user device.

At decision block 616, if the IAB node determines that the supplemental wireless access link is to be established, the process 600 may proceed to block 618. At block 618, the IAB node may establish the supplemental wireless access link via the additional NB-IoT carrier. In alternative embodiments, the IAB node may coordinate with another linked IAB node or a linked IAB donor node to establish the supplemental wireless access link via the additional NB-IoT carrier between the linked IAB node or the linked IAB node. However, if the IAB node determines that no supplemental wireless access link is to be established, the process 600 may loop back to block 608. Returning to decision block 610, if the IAB node determines that the wireless user device is not within range to establish the wireless access link via the FDD carrier, the process 600 may also proceed to block 612. While the operations included in blocks 608-618 of the process 600 are described as being performed by an IAB node, the IAB donor node may perform similar operations in other embodiments.

FIG. 7 is a flow diagram of an example process 700 for using a combination of NB-IoT carriers with TDD and FDD carriers to implement wireless backhaul links and wireless access links for an IAB node. At block 702, an IAB node may establish a wireless backhaul link between the IAB node and the IAB donor node or between the IAB node and another IAB node that is linked to the IAB donor node, in which the wireless backhaul link is established via an FDD carrier. The IAB donor node may have a backhaul, e.g., a fiber optics cable connection, a microwave relay connection, an AAV connection, and/or so forth to a core network of a wireless carrier network.

At block 704, the IAB node may establish one or more corresponding wireless backhaul links between the IAB node and one or more additional IAB nodes via one or more corresponding FDD carriers. Each of the corresponding wireless backhaul links may enable a corresponding IAB node to exchange communication with the core network of the wireless carrier network.

At block 706, the IAB node may establish a wireless access link between the IAB node and an NB-IoT user device via an NB-IoT carrier. At block 708, the IAB node may determine whether a wireless user device is within range of the IAB node to establish an additional wireless access link between the IAB node and the wireless user device via a TDD carrier. At decision block 710, if the IAB node determines that the wireless user device is in-range, the process 700 may proceed to block 712. At block 712, the IAB node may establish the additional wireless access link via the TDD carrier.

At block 714, the IAB node may determine whether to establish one or more supplemental wireless access links between the IAB node and the wireless user device via at least one of an FDD carrier or an additional NB-IoT carrier. For example, the IAB node may determine that a supplemental wireless access link is to be established when the FDD carrier is unable to provide sufficient data transmission bandwidth for a data throughput between the IAB node and the wireless user device. Subsequently, if additional data transmission bandwidth is still needed, the IAB node may establish the additional NB-IoT carrier.

At decision block 716, if the IAB node determines that the one or more supplemental wireless access links are to be established, the process 600 may proceed to block 718. At block 718, the IAB node may establish the one or more supplemental wireless access links via at least one of the FDD carrier or the additional NB-IoT carrier. In alternative embodiments, the IAB node may coordinate with another linked IAB node or a linked IAB donor node to establish the one or more supplemental wireless access links via at least one of the FDD carrier or additional NB-IoT carrier between the linked IAB node or the linked IAB node. For example, the FDD carrier and the NB-IoT carrier may be established with a single IAB base station or different IAB base stations.

However, if the IAB node determines that no supplemental wireless access link is to be established, the process 700 may loop back to block 708. Returning to decision block 710, if the IAB node determines that the wireless user device is not within range to establish the wireless access link via the TDD carrier, the process 700 may also proceed to block 712. While the operations included in blocks 708-718 of the process 700 are described as being performed by an IAB node, the IAB donor node may perform similar operations in other embodiments.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of an integrated access and backhaul (IAB) node of a wireless carrier network storing computer-executable instructions that upon execution cause one or more processors to perform acts comprising:
   establishing a wireless backhaul link between the IAB node and an IAB donor node via a first Narrow-Band Internet-of-Things (NB-IoT) carrier, the IAB donor node providing the IAB node with access to a wired backhaul connection that links to a core network of the wireless carrier network;
   establishing one or more corresponding wireless backhaul links between the IAB node and one or more additional IAB nodes via one or more corresponding NB-IoT carriers;
   establishing a wireless access link between the IAB node and an NB-IoT user device or between the IAB donor node and the NB-IoT user device via a second NB-IoT carrier;
   attempting to establish a second wireless access link between one of the IAB node or the IAB donor node and a non-NB-IoT user device via a frequency division duplex (FDD) carrier or a time division duplex (TDD) carrier; and
   responsive to determining that the FDD carrier and the TDD carrier are unavailable for the second wireless access link, attempting to establish the second wireless access link via a third NB-IoT carrier.

2. The one or more non-transitory computer-readable media of claim 1, wherein the NB-IoT user device has an additional wireless access link established via the third NB-IoT carrier with one of the one or more additional IAB nodes.

3. The one or more non-transitory computer-readable media of claim 2, wherein the additional wireless access link is established when the second NB-IoT carrier is determined to be unable to provide sufficient transmission bandwidth for a data throughput of the NB-IoT user device.

4. The one or more non-transitory computer-readable media of claim 1, wherein at least one of the one or more additional IAB nodes provides one or more wireless access links to one or more additional NB-IoT user devices via one or more additional NB-IoT carriers.

5. The one or more non-transitory computer-readable media of claim 1, wherein the IAB donor node provides an additional wireless access link to an additional NB-IoT user device via an additional NB-IoT carrier.

6. The one or more non-transitory computer-readable media of claim 1, wherein upon execution, the computer-executable instructions cause the one or more processors to perform acts comprising:
   establishing a third wireless access link between a second non-NB-IoT user device and a first of the IAB donor node or the IAB node via a second FDD carrier; and
   establishing a fourth wireless access link between the second non-NB-IoT user device and a second of the IAB donor node or the IAB node via a second TDD carrier.

7. The one or more non-transitory computer-readable media of claim 1, wherein the IAB donor node includes a central unit (CU) portion that comprises an NB-IoT CU, and a distributed unit (DU) portion that includes one or more NB-IoT DUs.

8. A system, comprising:
   one or more processors; and
   memory including a plurality of computer-executable components that are executable by the one or more processors to perform a plurality of actions, the plurality of actions comprising:
      establishing a wireless backhaul link between the IAB node and an IAB donor node of a wireless carrier network via a first Narrow-Band Internet-of-Things (NB-IoT) carrier, the IAB donor node providing the IAB node with access to a wired backhaul connection that links to a core network of the wireless carrier network;
      establishing one or more corresponding wireless backhaul links between the IAB node and one or more additional IAB nodes via one or more corresponding NB-IoT carriers; and
      establishing a wireless access link between the IAB node and an NB-IoT user device or between the IAB donor node and the NB-IoT user device via second NB-IoT carrier;
      attempting to establish a second wireless access link between one of the IAB node or the IAB donor node and a non-NB-IoT user device via a frequency division duplex (FDD) carrier or a time division duplex (TDD) carrier; and
      responsive to determining that the FDD carrier and the TDD carrier are unavailable for the second wireless access link, attempting to establish the second wireless access link via a third NB-IoT carrier.

9. The system of claim 8, wherein the NB-IoT user device has an additional wireless access link established via the third NB-IoT carrier with one of the one or more additional IAB nodes.

10. The system of claim 9, wherein the additional wireless access link is established when the second NB-IoT carrier is determined to be unable to provide sufficient transmission bandwidth for a data throughput of the NB-IoT user device.

11. The system of claim 8, wherein at least one of the one or more additional IAB nodes provides one or more wireless access links to one or more additional NB-IoT user devices via one or more additional NB-IoT carriers.

12. The system of claim 8, wherein the IAB donor node provides an additional wireless access link to an additional NB-IoT user device via an additional NB-IoT carrier.

13. The system of claim 8, wherein an NB-IoT carrier is a carrier of a 4G Long-Term Evolution (LTE) frequency band.

14. The system of claim 8, wherein the IAB donor node includes a central unit (CU) portion that comprises an NB-IoT CU, and a distributed unit (DU) portion that includes one or more NB-IoT DUs.

15. A computer-implemented method, comprising:
establishing a wireless backhaul link between the IAB node and an IAB donor node of a wireless carrier network via a first Narrow-Band Internet-of-Things (NB-IoT) carrier, the IAB donor node providing the IAB node with access to a wired backhaul connection that links to a core network of the wireless carrier network;
establishing one or more corresponding wireless backhaul links between the IAB node and one or more additional IAB nodes via one or more corresponding NB-IoT carriers;
establishing a wireless access link between the IAB node and an NB-IoT user device or between the IAB donor node and the NB-IoT user device via a second NB-IoT carrier;
attempting to establish a second wireless access link between one of the IAB node or the IAB donor node and a non-NB-IoT user device via a frequency division duplex (FDD) carrier or a time division duplex (TDD) carrier; and
responsive to determining that the FDD carrier and the TDD carrier are unavailable for the second wireless access link, attempting to establish the second wireless access link via a third NB-IoT carrier.

16. The computer-implemented method of claim 15, wherein the NB-IoT user device has an additional wireless access link established via the third NB-IoT carrier with one of the one or more additional IAB nodes.

17. The computer-implemented method of claim 16, wherein the additional wireless access link is established when the second NB-IoT carrier is determined to be unable to provide sufficient transmission bandwidth for a data throughput of the NB-IoT user device.

18. The computer-implemented method of claim 15, wherein at least one of the one or more additional IAB nodes provides one or more wireless access links to one or more additional NB-IoT user devices via one or more additional NB-IoT carriers.

19. The computer-implemented method of claim 15, wherein the IAB donor node provides an additional wireless access link to an additional NB-IoT user device via an additional NB-IoT carrier.

20. The computer-implemented method of claim 15, wherein an NB-IoT carrier is a carrier of a 4G Long-Term Evolution (LTE) frequency band.

* * * * *